United States Patent
Ahn (10) Patent No.: US 9,825,266 B2
(45) Date of Patent: Nov. 21, 2017

(54) BATTERY PACK

(71) Applicant: SAMSUNG SDI CO., LTD., Yongin-si, Gyeonggi-do (KR)

(72) Inventor: Jang-Gun Ahn, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 121 days.

(21) Appl. No.: 14/618,096

(22) Filed: Feb. 10, 2015

(65) Prior Publication Data
US 2015/0243946 A1    Aug. 27, 2015

(30) Foreign Application Priority Data

Feb. 21, 2014  (KR) .................. 10-2014-0020164

(51) Int. Cl.
| | |
|---|---|
| *H01M 2/10* | (2006.01) |
| *H01M 2/22* | (2006.01) |
| *H01M 2/08* | (2006.01) |
| *H01M 10/42* | (2006.01) |

(52) U.S. Cl.
CPC .......... *H01M 2/1072* (2013.01); *H01M 2/08* (2013.01); *H01M 2/10* (2013.01); *H01M 2/22* (2013.01); *H01M 10/4257* (2013.01); *H01M 2010/4271* (2013.01); *H01M 2220/20* (2013.01)

(58) Field of Classification Search
CPC ........ H01M 2/1072; H01M 2/22; H01M 2/08; H01M 10/4257
USPC ................................. 429/185, 163
See application file for complete search history.

(56) References Cited

U.S. PATENT DOCUMENTS

| | | |
|---|---|---|
| 5,818,198 A | 10/1998 | Mito et al. |
| 2005/0130030 A1 | 6/2005 | Watanabe et al. |
| 2010/0124693 A1 | 5/2010 | Kosugi et al. |
| 2011/0135970 A1 | 6/2011 | Han et al. |
| 2012/0058374 A1* | 3/2012 | Aota .................... B23K 35/365 429/94 |
| 2012/0121938 A1* | 5/2012 | Kwag ..................... H01M 2/34 429/7 |
| 2012/0214053 A1 | 8/2012 | Kim |
| 2012/0301747 A1* | 11/2012 | Han .................... H01M 2/1005 429/7 |
| 2013/0189549 A1* | 7/2013 | Nemoto ............. H01M 10/482 429/7 |

FOREIGN PATENT DOCUMENTS

| | | |
|---|---|---|
| EP | 1498964 A1 | 1/2005 |
| JP | H 8-293327 A | 11/1996 |

(Continued)

OTHER PUBLICATIONS

European Office Action dated May 29, 2015.

(Continued)

*Primary Examiner* — Osei Amponsah
(74) *Attorney, Agent, or Firm* — Lee & Morse, P.C.

(57) ABSTRACT

A battery pack includes at least one battery module, a housing accommodating the at least one battery module therein, a controller to control the at least one battery module, a partition positioned between the controller and the at least one battery module, and a connector at least partially passing through the partition, the connector electrically connecting the at least one battery module with the controller.

19 Claims, 7 Drawing Sheets

(56) References Cited

FOREIGN PATENT DOCUMENTS

KR        20-0147533 Y1    3/1999
KR   10-2012-0095290 A1   8/2012

OTHER PUBLICATIONS

European Examination Report dated Nov. 11, 2016 in Corresponding European Patent Application No. 15155438.3.
European Examination Report dated May 11, 2017 in Corresponding European Patent Application No. 15155438.3.

\* cited by examiner

BATTERY PACK

CROSS-REFERENCE TO RELATED APPLICATION

Korean Patent Application No. 10-2014-0020164, filed on Feb. 21, 2014, in the Korean Intellectual Property Office, and entitled: "Battery Pack," is incorporated by reference herein in its entirety.

BACKGROUND

1. Field

The present disclosure relates to a battery pack.

2. Description of the Related Art

Recently, a high-power battery pack with high-energy density using a non-aqueous electrolyte is being developed. Such a high-power battery pack is implemented in high voltage or high capacity by connecting a plurality of battery cells or modules in parallel or in series so as to be used in driving a motor of a device requiring high power, e.g., an electric vehicle.

As devices adopting such a battery pack increase, research into improvement on the productivity of the battery pack is conducted. Further, as the devices have various appearances, the battery pack also requires various shapes. However, since the battery pack should essentially have safety, research into the structure of the battery pack which is capable of satisfying the above requirements is conducted in many ways.

SUMMARY

Embodiments provide a battery pack, which adopts a novel structure to enhance safety.

According to an embodiment, there is provided a battery pack including at least one battery module, a housing accommodating the at least one battery module therein, a controller controlling the at least one battery module, a partition positioned between the controller and the at least one battery module, and a connector at least partially passing through the partition, the connector electrically connecting the at least one battery module with the controller.

An insert part may be formed in the connector, the insert part including a first insert part on a first side thereof and a second insert part on a second side thereof.

Further, a thread may be formed on an inner wall of the connector having the insert part.

A terminal of the battery module may be inserted into the first insert part of the connector so as to be coupled to the connector.

The terminal may be fastened to the connector by a threaded fastening method.

The first insert part may communicate with the second insert part.

The connector may be electrically connected to the controller via a busbar.

The battery pack may further include a through hole formed in the busbar in such a way as to correspond to the second insert part, and a coupling member passing through the through hole and inserted into the second insert part to be coupled to the connector.

The coupling member may pass through the through hole and then is fastened to the connector by a threaded fastening method.

A first opening may be formed in the partition, a sealing part having a second opening may be positioned in the first opening, and the connector may pass through the second opening.

The sealing part may hermetically seal a gap between a space in which the battery module is positioned and a space in which the controller is positioned.

The housing may include a body part in which a receiving part is formed to receive the battery module, and a cover part covering the body part, and the cover part may cover the partition on which the controller is disposed.

The connector may include a first region facing the battery module, and a second region facing away from the battery module, and the first region may be different from the second region in a sectional shape.

The first region of the connector may pass through the partition to be connected to the battery module.

The first region may have a circular section, and the second region may have a polygonal section.

The controller may include at least one selected out from a group consisting of a battery control unit (BCU), a battery management system (BMS), and a battery disconnect unit (BDU).

The connector may have a cylindrical shape.

Sidewalls of the housing may accommodate the at least one battery module and the controller, and the partition separates the housing into two completely separate spaces for the at least one battery module and the controller, respectively.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

The terms or words used in the description and the claims of the example embodiments should not be interpreted as being limited merely to common and dictionary meanings. On the contrary, they should be interpreted based on the meanings and concepts in keeping with the scope of the embodiments.

Although the terms "first", "second", etc. are used herein to describe various elements, these elements should not be limited by these terms. These terms are only used to distinguish one element from another element. In the following description, if it is decided that the detailed description of known function or configuration related to the embodiments makes the subject matter thereof, the detailed description is omitted.

Hereinafter, the embodiments will be described in detail with reference to the accompanying drawings.

Figure 1:
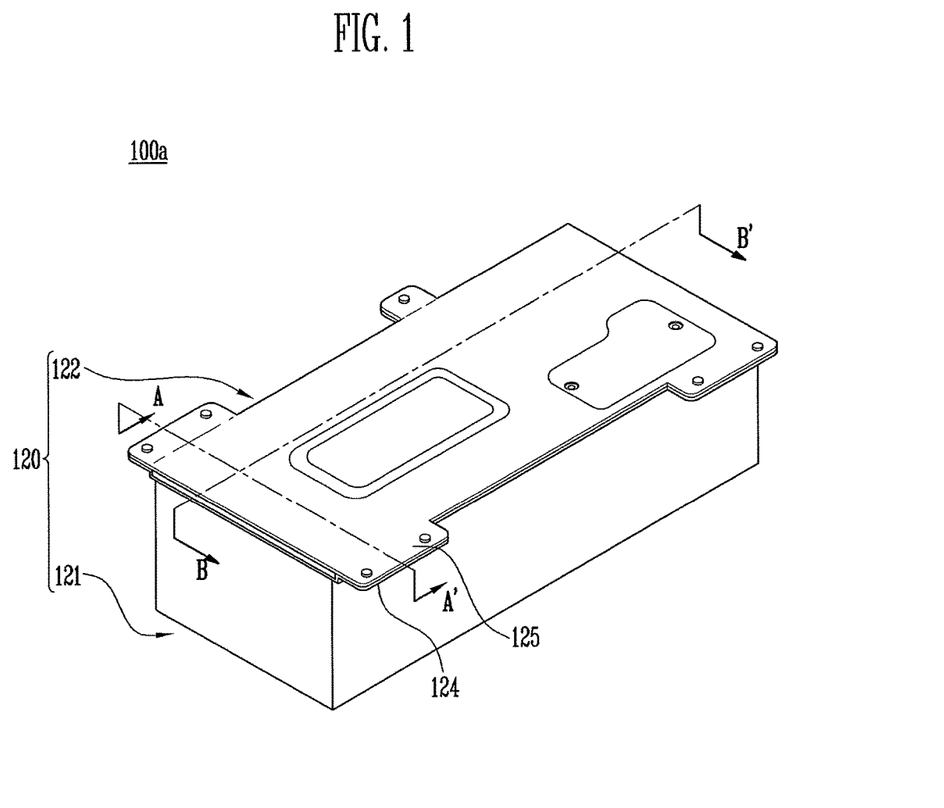
FIG. 1 illustrates a perspective view of a battery pack according to an embodiment.
Figure 2:
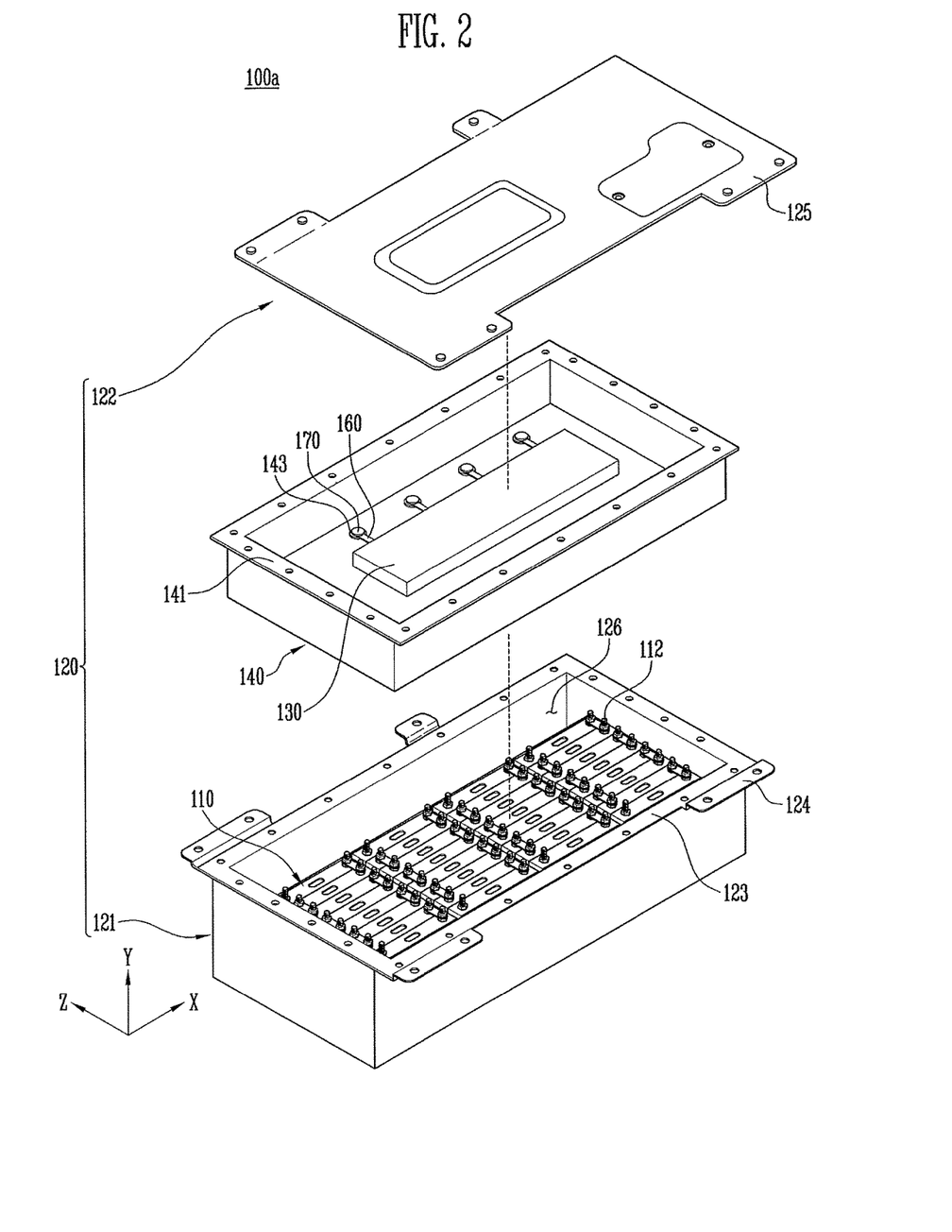
FIG. 2 illustrates an exploded perspective view of the battery pack of FIG. 1.

FIG. 1 is a perspective view showing a battery pack 100a according to an embodiment, and FIG. 2 is an exploded perspective view showing the battery pack 100a of FIG. 1. Hereinafter, the battery pack 100a according to this embodiment will be described with reference to FIGS. 1 and 2.

As shown in FIGS. 1 and 2, the battery pack 100a according to this embodiment may include a battery module 110, a housing 120, a controller 130, a partition 140 separating a space accommodating the battery module 110 from a space accommodating the controller 130, and a connector 150a (see FIG. 5) that passes through the partition 140 to electrically connect the battery module 110 to the controller 130.

The housing 120 is a member that accommodates the battery module 110 therein, and may include a body part 121 and a cover part 122. Here, the body part 121 may be provided with a receiving part 126 to receive the battery module 110, and the cover part 122 may cover the body part 121.

Further, as illustrated in FIG. 2, the body part 121 may be provided with a first flange 123 and a first extension 124. The first flange 123 extends from a sidewall of the body part 121 in such a way as to be bent therefrom, and the first extension 124 extends from the first flange 123. The first extension 124 is coupled to a second extension 125 extending outwards from the cover part 122, thus allowing the body part 121 and the cover part 122 to be coupled with each other.

The first extension 124 may extend from the first flange 123 in such a way as to be stepped. For example, as illustrated in FIG. 2, the first extension 124 has a step shape that extends higher than, e.g., above, the first flange 123. Such a configuration allows a second flange 141 of the partition 140 (which will be described below) to be seated on the first flange 123 and be fitted inside the first extension 124, e.g., without extending above the first extension 124.

Figure 3:
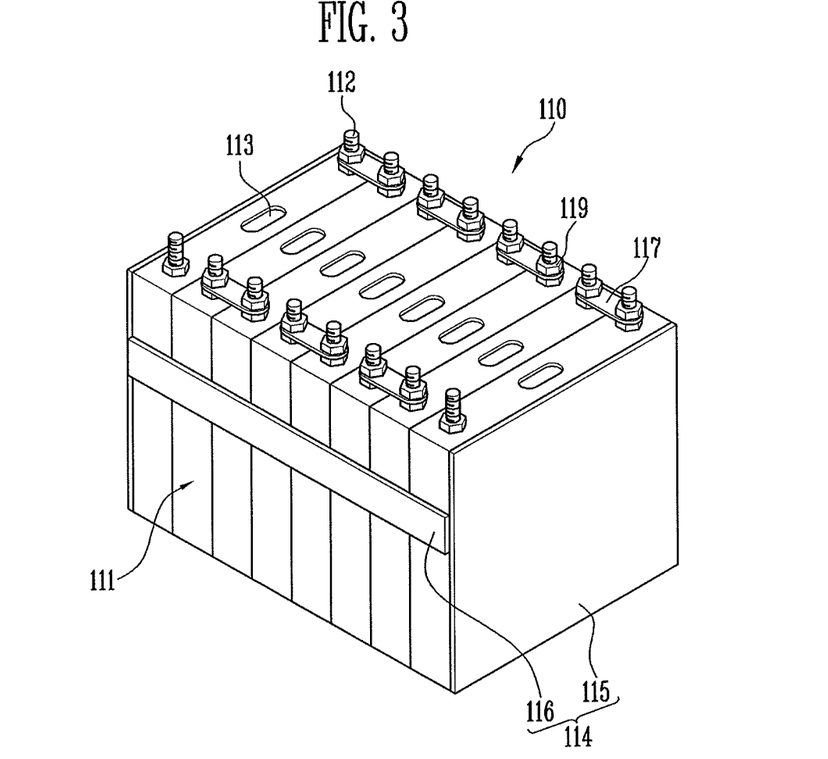
FIG. 3 illustrates a perspective view of a battery module of the battery pack of FIG. 1.

FIG. 3 is a perspective view showing the battery module 110 of the battery pack 100a of FIG. 1. Hereinafter, the battery module 110 according to this embodiment will be described with reference to FIG. 3. As shown in FIG. 3, the battery module 110 according to this embodiment may include a plurality of battery cells 111, module busbars 117 electrically connecting the battery cells 111 to each other, and an alignment member 114 aligning the battery cells 111 with each other.

The battery cell 111 is a member that generates energy. A plurality of battery cells may be provided. Here, each battery cell 111 may include a battery case that is open at a surface thereof, and an electrode assembly and an electrolyte that are received in the battery case. The electrode assembly and the electrolyte electrochemically may react with each other to produce energy. For example, such a battery case may be sealed by a surface of the battery cell 111 including a cap assembly. Further, terminals 112 having different polarities, i.e., a positive terminal and a negative terminal, may be provided on a surface of the battery cell 111 in such a way as to protrude therefrom. As the safety means of the battery cell 111, a vent part 113 may be further provided, which serves as a passage for discharging gas produced in the battery cell 111 to the outside.

Meanwhile, the plurality of battery cells 111 may be aligned in one direction. When the battery cells 111 are connected to each other in series, they may be arranged such that the terminals 112 of neighboring battery cells 111 have different polarities. On the other hand, when the battery cells 111 are connected to each other in parallel, they may be arranged such that the terminals 112 of neighboring battery cells 111 have the same polarity. Further, the battery cells 111 may be aligned by the alignment member 114. For example, the alignment member 114 may include a pair of end plates 115 disposed on the outermost battery cells 111 and a connection plate 116 connecting the end plates 115 to each other, thus allowing the battery cells 111 to be aligned in one direction.

Further, the module busbar 117 is a member that electrically connects the battery cells 111 to each other. By way of example, the module busbar 117 is provided with a hole. Thus, after the terminal 112 of the battery cell 111 passes through the hole of the module busbar 117, a nut member 119 is fastened to the terminal 112, so that the module busbar 117 is electrically connected to the terminal 112 of the battery cell 111. However, without being limited thereto, the module busbar 117 may be coupled to the terminal 112 of the battery cell 111 by welding.

Meanwhile, a high current produced by connecting the battery cells 111 in series or in parallel may flow in the terminal 112 of the outermost battery cell 111 among the plurality of battery cells 111. Such a high current may be transmitted to the controller 130 through the connector 150a and a busbar 160 which will be described below. Further, the battery pack 100a according to this embodiment may include at least one battery module 110.

Figure 4:
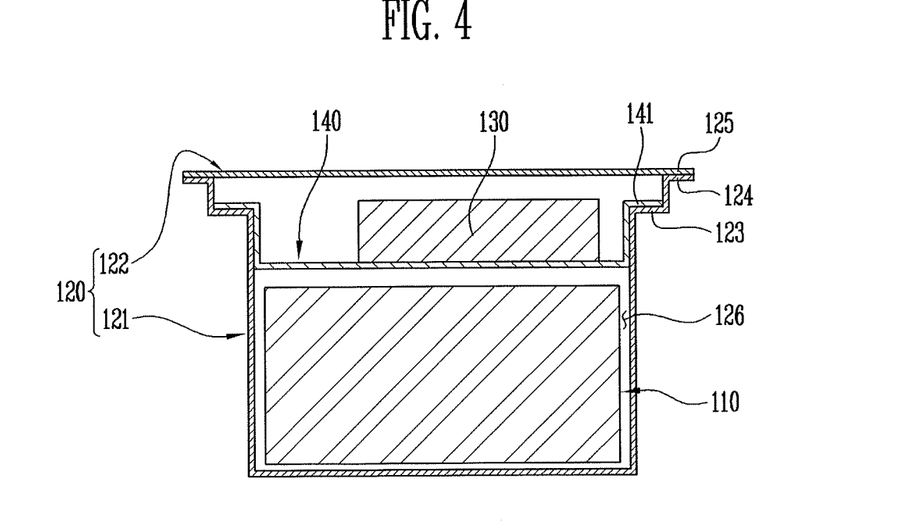
FIG. 4 illustrates a sectional view along line A-A' of FIG. 1.
Figure 5:
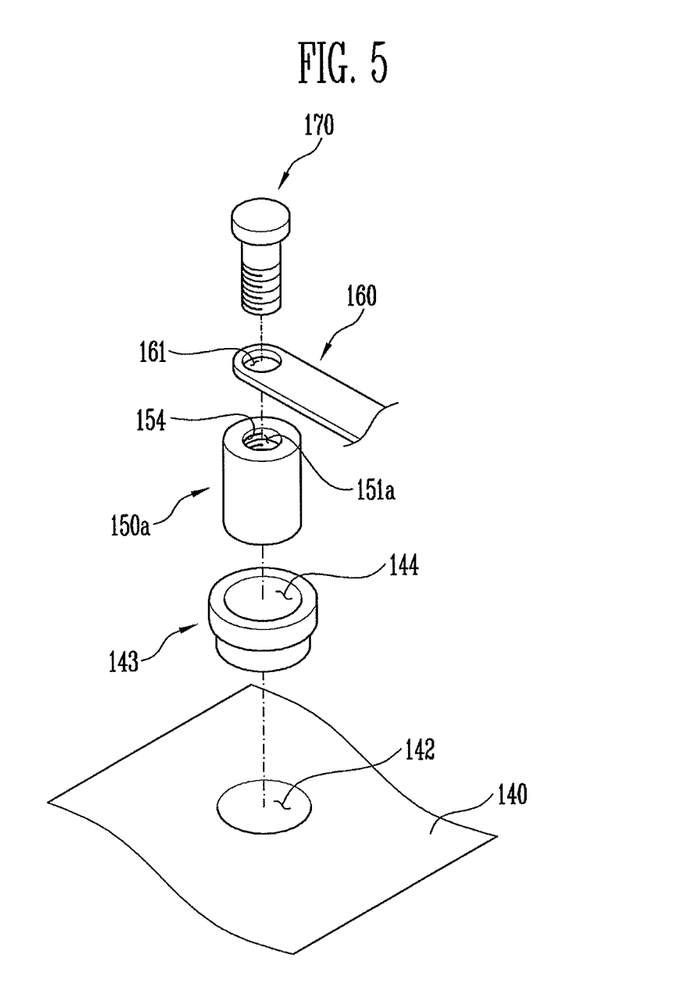
FIG. 5 illustrates an exploded perspective view of a connector and a partition of the battery pack of FIG. 2.

FIG. 4 is a sectional view showing the battery pack 100a taken along line A-A' of FIG. 1, and FIG. 5 is an exploded perspective view showing the connector 150a and the partition 140 of the battery pack 100a of FIG. 2. Hereinafter, the controller 130 and the partition 140 according to this embodiment will be described with reference to FIGS. 4 and 5.

As shown in FIG. 4, the controller 130 may be disposed on the partition 140. In detail, the controller 130 may be positioned between the partition 140 and the cover part 122 in such a way that a side thereof is surrounded with the body part 121 of the housing 120.

The controller 130 may control and protect the battery module 110. Such a controller 130 may include at least one of a battery control unit (BCU), a battery management system (BMS), and a battery disconnect unit (BDU). For example, the controller 130 may measure the voltage, SOC, temperature, etc. of the battery module 110, and then interrupt power when an abnormal phenomenon, e.g., overcurrent or overvoltage, occurs in the battery pack 100*a*.

Since the controller 130 includes electronic parts and circuits, the controller 130 may be susceptible to moisture. Thus, if the controller 130 and the battery module 110 were to be placed in a same space, and if the temperature of the battery module 110 were to be abruptly changed (thus producing condensate water), the condensate water could negatively affect the controller 130, thereby leading to malfunction of the controller 130. Further, if the controller 130 and the battery module 110 were to be placed in a same space, air for cooling the battery module 110 could negatively affect the controller 130, thus causing malfunction of the controller 130.

Therefore, according to embodiments, the battery module 110 is separated from the controller 130 by the partition 140, thus allowing the battery module 110 and the controller 130 to be positioned in separate and independent spaces. Therefore, the controller 130 may be less affected by moisture or cooling air in the space allocated for the battery module 110. Consequently, the safety of the battery pack 100*a* may be improved.

As shown in FIGS. 2 and 4, the partition 140 is a member that renders the battery module 110 and the controller 130 to be positioned in different independent spaces. The partition 140 may be positioned between the battery module 110 and the controller 130.

In this regard, the partition 140 may be positioned between the battery module 110 and the controller 130, and may be covered by the cover part 122 of the housing 120. For example, the second flange 141 of the partition 140 may extend from a sidewall of the partition 140 in such a way as to be bent therefrom, and may be superimposed on the first flange 123 of the body part 121 of the housing 120. For example, as illustrated in FIG. 4, the second flange 141 of the partition 140 may be bent away from the sidewall of the partition 140, e.g., the second flange 141 may be perpendicular to the sidewall of the partition 140, and may surround the, e.g., entire, perimeter of the partition 140 (FIG. 2). For example, as further illustrated in FIG. 4, the second flange 141 may extend on, e.g., directly on, the first flange 123 of the body part 121 of the housing 120, so the first flange 123 and second flange 141 completely, e.g., and continuously, overlap each other. In this case, the body part 121 of the housing 120 may be coupled with the partition 140 using a member, e.g., a bolt, passing through both the first and second flanges 123 and 141.

Further, the second flange 141 of the partition 140 may overlap the first flange 123 in such a way as to be inside the first extension 124 of the body part 121. That is, since a step is provided between the first flange 123 and the first extension 124, as illustrated in FIG. 4, the second flange 141 may be easily placed on the top of the first flange 123, while being below the top of the first extension 124. In the state where the body part 121 is coupled with the partition 140, the cover part 122 is positioned thereabove. That is, the cover part 122 may be placed on the first extensions 124, as further illustrated in FIG. 4, so the second extension 125 of the cover part 122 may be fastened to the first extension 124 of the body part 121 via, e.g., bolts. As such, the body part 121, the partition 140, and the cover part 122 may be fastened to each other.

As described previously, the partition 140 is positioned between the battery module 110 and the controller 130. The partition 140 separates the space accommodating the battery module 110 from the space accommodating the controller 130 in such a way as to hermetically seal a gap between the spaces. Thus, moisture and cooling air produced in the space accommodating the battery module 110 cannot enter the space accommodating the controller 130, thereby protecting the controller 130. Further, the partition 140 is made of an insulating material, thus preventing a short circuit from occurring between the battery module 110 and the controller 130. For example, the insulating material of the partition 140 may include at least one of polyethylene, polypropylene, and polycarbonate.

Further, as illustrated in FIG. 5, the partition 140 may be provided with a first opening 142 through which the connector 150*a* passes. In detail, as shown in FIG. 5, the first opening 142 may be larger, e.g., have a wider diameter, than the connector 150*a*, and a sealing part 143 may be positioned between the first opening 142 and the connector 150*a*. That is, the sealing part 143 is positioned inside the first opening 142, and a second opening 144 is formed in the sealing part 143, thus allowing the connector 150*a* to pass through the partition 140 via the second opening 144, e.g., the first and second openings 142 and 144 may be concentric. As such, the sealing part 143 prevents the space accommodating the battery module 110 and the space accommodating the controller 130 from having fluid communication with each other via the first opening 142, thus sealing both spaces from each other.

Figure 6:
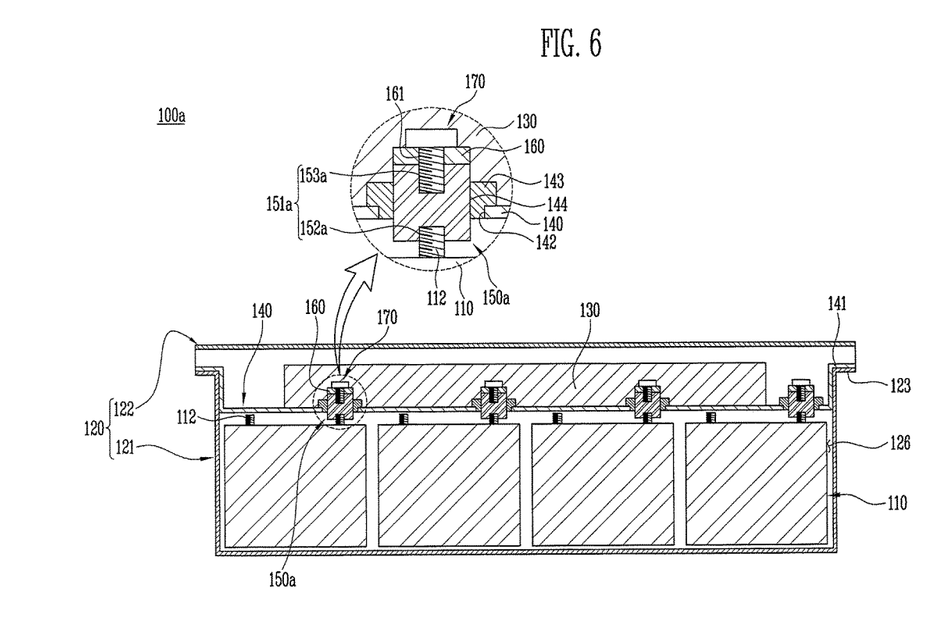
FIG. 6 illustrates a sectional view along line B-B' of FIG. 1.
Figure 7:
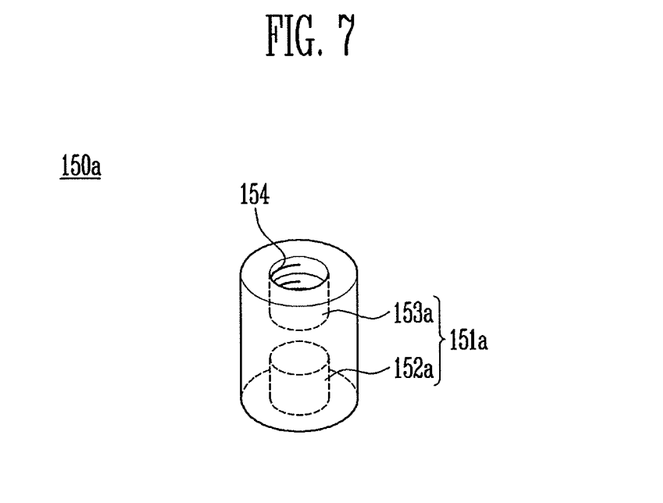
FIG. 7 illustrates a perspective view of the connector of the battery pack of FIG. 1.

FIG. 6 is a sectional view showing the battery pack 100*a* taken along line B-B' of FIG. 1, and FIG. 7 is a perspective view showing the connector 150*a* of the battery pack 100*a* of FIG. 1. It is noted that the cross-section of FIG. 6 illustrates a view as seen in a direction oriented from the sealing parts 143 toward the controller 130 in FIG. 2 (i.e., so the controller 130 is seen behind some of the sealing parts 143). Hereinafter, the connector 150*a* according to this embodiment will be described in more detail with reference to FIGS. 5 to 7.

As shown in FIGS. 5 to 7, at least a portion of the connector 150*a* according to this embodiment passes through the partition 140 to electrically connect the battery module 110 to the controller 130. Further, the connector 150*a* may pass through the first opening 142 of the partition 140, or may pass through the second opening 144 of the sealing part 143 (if the sealing part 143 is present). Here, the second opening 144 may be smaller than the connector 150*a*, so that the connector 150*a* may be press-fitted into the second opening 144. Thus, since an inner wall of the sealing part 143 having the second opening 144 comes into close contact with the connector 150*a*, the space accommodating the battery module 110 and the space accommodating the controller 130 may be sealed from each other. In order to further increase a sealing force, the sealing part 143 may be made of an elastic material, e.g., rubber.

Meanwhile, the connector 150*a* may electrically connect the battery module 110 to the controller 130. In this context, the meaning of 'electrically connected' will suffice as long as an electric current flows between the members even if they are connected to each other via another member, without being limited to the state where two members are directly and physically connected to each other. That is, both the case where the connector 150*a* is directly connected to the controller 130, and the case where the connector 150*a* is connected to the controller 130 via the busbar 160, will be considered as the connector 150*a* being electrically connected to the controller 130. For the convenience of description, the case where the connector 150*a* is connected to the controller 130 via the busbar 160 will be described below.

However, embodiments are not limited thereto. The power or condition of the battery module 110 may be transmitted to the controller 130 through the connector 150a. Thus, the controller 130 may control the battery module 110 through the connector 150a.

Since the connector 150a electrically connects the battery module 110 to the controller 130, the connector 150a may include a material having high electrical conductivity, e.g., gold, silver, copper, or nickel. Further, the connector 150a may have a cylindrical shape. In this case, when the connector 150a is press-fitted into the sealing part 143, stress acting on each region of the cylindrically shaped connector 150a may be constant, thus enhancing the sealing force of the sealing part 143.

The connector 150a may be formed in the shape of a pillar having an insert part 151a therein. In detail, a first insert part 152a may be formed on a first side of the connector 150a, while a second insert part 153a may be formed on a second side of the connector 150a that is opposite to the first side. The first insert part 152a may open toward the battery module 110, while the second insert part 153a may open in an opposite direction, i.e., toward the controller 130. Further, threads 154 may be formed on an inner wall of the connector 150a in which the insert part 151a, including the first insert part 152a and the second insert part 153a, is formed.

The terminal 112 of the battery module 110 is inserted into the first insert part 152a of the connector 150a to be fastened to the threads 154, so that the terminal 112 and the connector 150a may be electrically connected to each other through a threaded fastening portion. For example, the terminal 112 fastened to the connector 150a may be the terminal 112 in which the high current of the battery module 110 flows.

Meanwhile, a coupling member 170, e.g., a bolt, may be inserted into the second insert part 153a of the connector 150a to be fastened thereto by the threaded fastening method. A through hole 161 may be formed at a first end of the busbar 160, i.e., position on the busbar 160 that is situated adjacent to the second side of the connector 150a, in such a way as to correspond to the second insert part 153a. The coupling member 170 passes through the through hole 161 to be inserted into the second insert part 153a and then fastened to the connector 150a, thus allowing the connector 150a and the first side of the busbar 160 to be firmly coupled to each other and electrically connected to each other. For example, as illustrated in FIG. 2, a second end of the busbar 160 may be connected to the controller 130. Therefore, the signal indicating the state of the battery module 110 and power may be transmitted through the connector 150a and the busbar 160 to the controller 130.

As such, the insert part 151a is provided in the connector 150a, so that the connector 150a, the terminal 112, the coupling member 170 or the busbar 160 are fastened by the threaded fastening method. As such, ease and convenience at the time of manufacture of the battery pack 100a may be enhanced.

Figure 8:
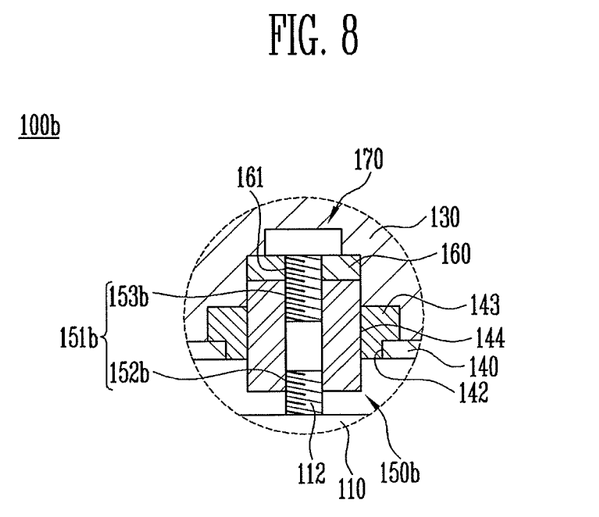
FIG. 8 illustrates a partial sectional view of a battery pack according to another embodiment.

FIG. 8 is a partial sectional view showing a battery pack 100b according to another embodiment. Hereinafter, the battery pack 100b according to this embodiment will be described with reference to FIG. 8. Here, elements common to both the embodiments will carry the same reference numerals, and a duplicated description thereof will be omitted herein.

As shown in FIG. 8, the battery pack 100b according to this embodiment may be configured such that a first insert part 152b and a second insert part 153b of a connector 150b communicate with each other. That is, the first insert part 152b and the second insert part 153b communicate with each other to be implemented in the form of a through hole that passes through the top and bottom of the connector 150b. For example, as illustrated in FIG. 8, the connector 150b may include a single, continuous through hole penetrating therethrough, and the first and second insert parts 152b and 153b may be defined at opposite sides of the through hole.

The terminal 112 of the battery module 110 may be inserted into the first insert part 152b, and the coupling member 170 passing through the through hole 161 of the busbar 160 may be inserted into the second insert part 153b. The coupling member 170 may be connected to or disconnected from the terminal 112 of the battery module 110 in the insert part 151b.

Figure 9:
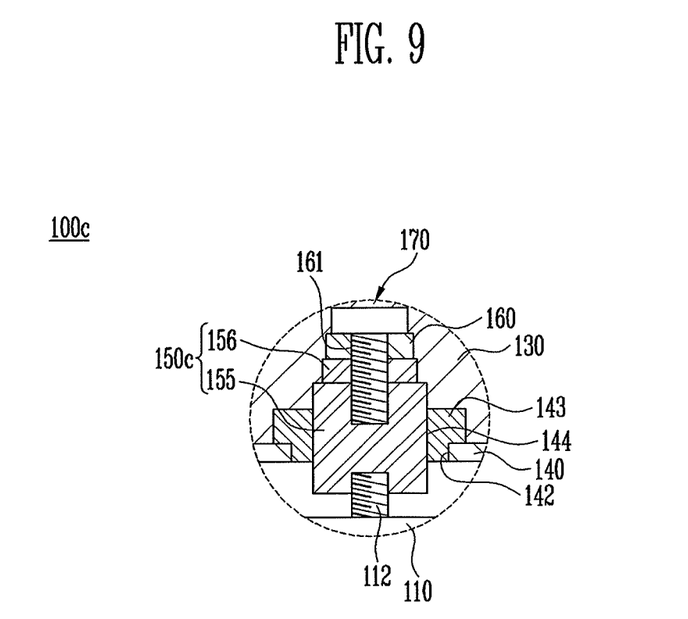
FIG. 9 illustrates a partial sectional view of a battery pack according to a further embodiment.
Figure 10:
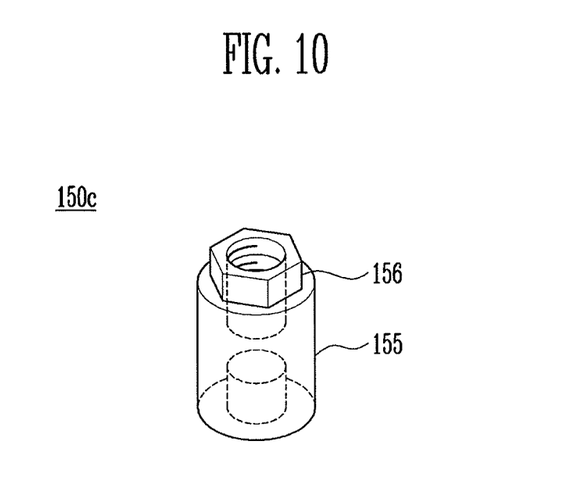
FIG. 10 illustrates a perspective view of a connector of the battery pack of FIG. 9.

FIG. 9 is a partial sectional view showing a battery pack 100c according to a further embodiment, and FIG. 10 is a perspective view showing a connector 150c of the battery pack 100c of FIG. 9. Hereinafter, the battery pack 100c according to this embodiment will be described with reference to FIGS. 9 and 10. Here, elements common to the embodiments will carry the same reference numerals, and a duplicated description thereof will be omitted herein.

The battery pack 100c of this embodiment may be different from that of the previous embodiments in the shape of the connector 150c. In detail, the connector 150c may include a first region 155 facing the battery module 110, and a second region 156 facing away from the battery module 110. The first region 155 may have different cross-sectional shape from the second region 156. For example, the first region 155 may pass through the partition 140, such that at least portion thereof may be positioned inside the second opening 144 of the sealing part 143. Thus, in order to maximize the sealing force of the sealing part 143, the first region 155 may have a circular section (i.e. the first region 155 may have a cylindrical shape). The second region 156, which does not pass through the partition 140, may have a polygonal cross-section. For example, the second region 156 may have a hexagonal cross-section and the shape of a hexagonal pillar. In this case, by catching and turning the second region 156 using a tool, the connector 150c may be easily fastened to the terminal 112 of the battery module 110.

By way of summation and review, as is apparent from the above description, a battery pack according to embodiments includes a space for a battery module that is separated, e.g., completely separated, from a space for a controller by a partition. As such, the safety of the battery pack is increased.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
at least one battery module;
a housing accommodating the at least one battery module therein;
a controller to control the at least one battery module;

a partition positioned between the controller and the at least one battery module; and a connector at least partially passing through the partition, the connector electrically connecting the at least one battery module with the controller, the connector including an insert part, the insert part having a first insert part on a first side thereof and a second insert part on a second side thereof, an end of the first insert part within the connector being separated from an end of the second insert part within the connector, wherein the first insert part extends through a first region of the connector, the first region of the connector facing the battery module and having a circular outer shape in a top view, and wherein the second insert part extends through a second region of the connector, the second region of the connector facing away from the battery module and having a polygonal outer shape in a top view.

2. The battery pack as claimed in claim 1, wherein the connector includes an insert part, the insert part having a first insert part in the first region and a second insert part in the second region.

3. The battery pack as claimed in claim 2, wherein the connector further comprises a thread on an inner wall of the insert part.

4. The battery pack as claimed in claim 3, wherein a terminal of the battery module is inserted into the first insert part of the connector.

5. The battery pack as claimed in claim 4, wherein the terminal is coupled to the connector via the thread.

6. The battery pack as claimed in claim 2, wherein the first insert part is in fluid communication with the second insert part.

7. The battery pack as claimed in claim 2, wherein the connector is electrically connected to the controller via a busbar.

8. The battery pack as claimed in claim 7, further comprising:

a through hole in the busbar, the through hole corresponding to the second insert part; and a coupling member through the through hole, the coupling member being inserted into the second insert part to be coupled to the connector, a terminal of the battery module being inserted into the first insert part of the connector, an end of the coupling member within the connector being separated from an end of the terminal within the connector.

9. The battery pack as claimed in claim 8, wherein the coupling member is fastened to the connector by a thread on an inner wall of the insert part.

10. A battery pack, comprising:

at least one battery module;

a housing accommodating the at least one battery module therein;

a controller to control the at least one battery module;

a partition positioned between the controller and the at least one battery module; and a connector at least partially passing through the partition, the connector electrically connecting the at least one battery module with the controller, wherein the partition includes a first opening and a sealing part within the first opening, the connector passing through a second opening in the sealing part, the sealing part being made of an elastic material, wherein the connector includes a first region and a second region, the first region facing the battery module, and the second region facing away from the battery module, wherein the first and second regions of the connector have different outer shapes in a top view, and wherein the first region of the connector has a circular outer shape in the top view, and the second region of the connector has a polygonal outer shape in the top view.

11. The battery pack as claimed in claim 10, wherein the sealing part hermetically seals a gap between a space accommodating the at least one battery module and a space accommodating the controller.

12. The battery pack as claimed in claim 1, wherein the housing includes a body part and a cover part, the body part having a receiving part to receive the at least one battery module, and the cover part covering the body part and the partition on which the controller is disposed.

13. A battery pack, comprising:

at least one battery module;

a housing accommodating the at least one battery module therein;

a controller to control the at least one battery module;

a partition positioned between the controller and the at least one battery module;

a connector at least partially passing through the partition, the connector electrically connecting the at least one battery module with the controller, wherein:

the connector includes a first region and a second region, the first region facing the battery module, and the second region facing away from the battery module and having a different cross-sectional shape than the first region; and the first region has a circular cross-section in a top view, and the second region has a polygonal cross-section in a top view.

14. The battery pack as claimed in claim 13, wherein the first region of the connector passes through the partition to be connected to the battery module.

15. The battery pack as claimed in claim 13, wherein the second region has a hexagonal cross-section and a shape of a hexagonal pillar.

16. The battery pack as claimed in claim 1, wherein the controller includes at least one of a battery control unit (BCU), a battery management system (BMS), and a battery disconnect unit (BDU).

17. The battery pack as claimed in claim 1, wherein a width of the circular outer shape is larger than a width of the polygonal outer shape in the top view.

18. The battery pack as claimed in claim 1, wherein sidewalls of the housing accommodate the at least one battery module and the controller, and the partition separates the housing into two completely separate spaces for the at least one battery module and the controller, respectively.

19. The battery pack as claimed in claim 10, wherein the sealing part includes rubber.

* * * * *